Dec. 7, 1965  R. S. GARDNER  3,221,694
TIME DELAY CIRCUITS FOR ECHO CONTROLLED STEERING GEAR
Filed Oct. 4, 1950
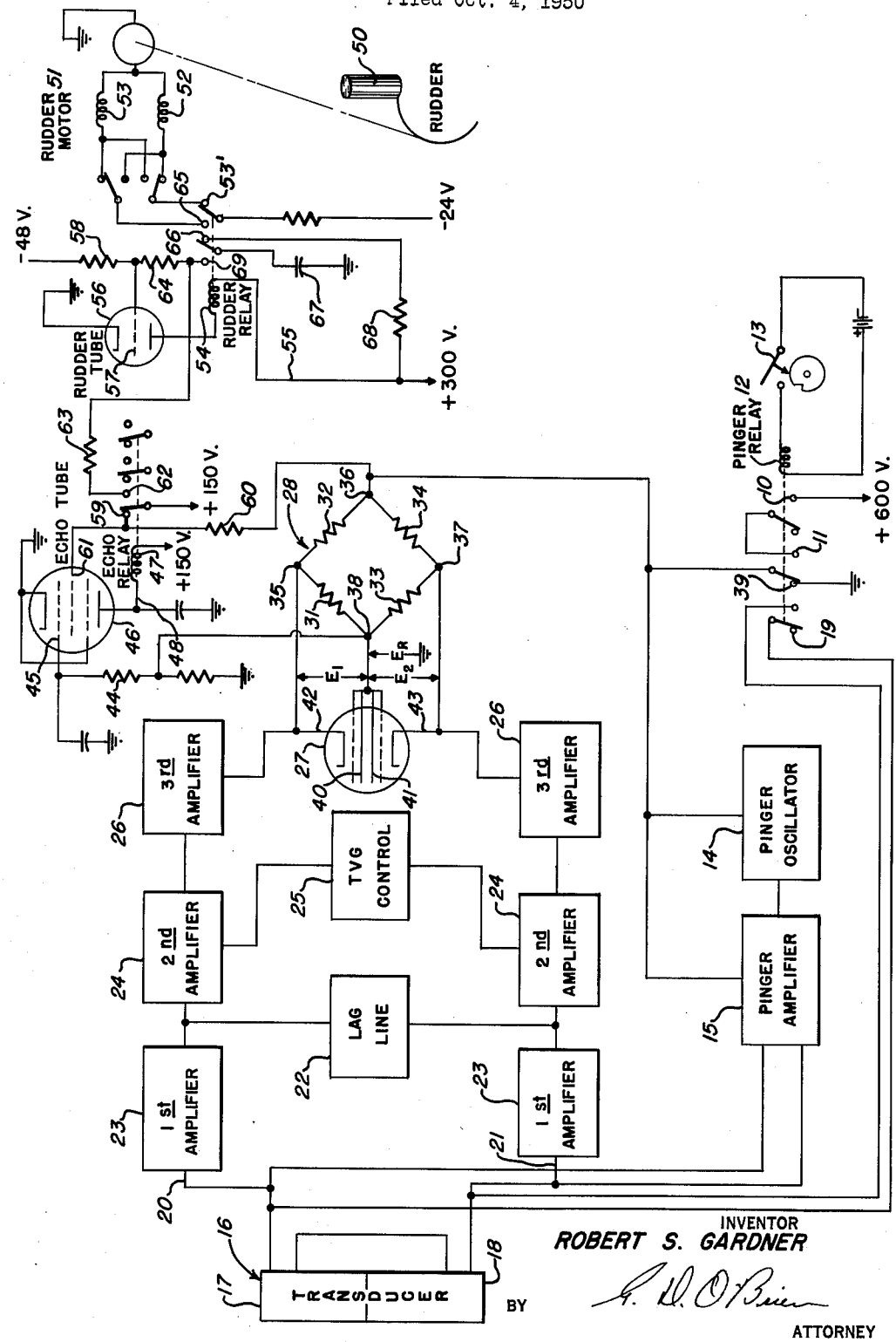
INVENTOR
ROBERT S. GARDNER
BY
ATTORNEY

United States Patent Office 3,221,694
Patented Dec. 7, 1965

3,221,694
TIME DELAY CIRCUITS FOR ECHO CONTROLLED STEERING GEAR
Robert S. Gardner, Key West, Fla., assignor, by mesne assignments, to the United States of America as represented by the Secretary of the Navy
Filed Oct. 4, 1950, Ser. No. 188,467
9 Claims. (Cl. 114—23)

The invention relates to improvements in control systems and more specifically to an echo tripping and rudder hold-in circuit for off-on steering gear.

In the off-on type of azimuthal steering as applied to an echo-controlled torpedo, the rudder is normally thrown to one side for turning in a circle while the torpedo is searching for a target, during the absence of echo signals. When the first echo of sufficient magnitude and duration is received during the search, while the torpedo is normally turning, for instance, in port circles, the torpedo will change its course from port to starboard. This will eventually result in the loss of the signal since the torpedo will turn away from the target. Upon loss of echo signals, the torpedo will resume its port circular turn until echoes are again received, when it will change its course once more to starboard. While the torpedo in its progress toward the target takes an alternately reversing course, actually the deviations produced by off-on steering are small. With sustained echo signals, the course toward the target is straight for all practical considerations.

However, to properly utilize the principle of off-on steering, the torpedo should turn off the target only as long as echoes are received, and in the event only a single echo is received, the torpedo should turn off the target only for a limited time to avoid sweeping through the target.

An important object of the invention is to provide off-on steering gear with means adapted to reverse the rudder position upon the expiration of a measured time interval following the reception of a single echo signal.

Another object of the invention is the provision of off-on steering gear with means adapted to reverse the rudder position upon the expiration of a measured time interval following the last of a series of received echo signals.

A further object is the provision of an echo-ranging type of torpedo with off-on steering gear having improved time control circuits.

Other objects and advantages of the invention will become apparent during the course of the following detailed description, taken in connection with the accompanying drawing, forming a part of this specification.

In the drawing, the single figure is a diagrammatic view of the improved off-on steering gear.

Under the control of series contacts 10, 11 of a pinger relay 12 energized upon closing of a cam-operated switch 13, pulses or pings of 60-kc. voltage and 30-milliseconds duration are generated and amplified by a pinger oscillator 14 and amplifier 15. These pulses or pings are sent out every 0.8 second through a transducer 16 whose vertically spaced sections 17, 18 are connected in parallel during transmission by a contact 19 of the pinger relay 12. The supersonic waves leave the transducer and, if there is a target present within range, are reflected back as echoes. Upon reaching the transducer, these echoes are translated into electrical input signals in dual amplifier channels 20, 21, the two parts of the transducer acting independently during reception.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. This phase difference is converted into an amplitude difference by a lag line 22 following the first stage 23 of dual amplification. This lag line 22 may be of a type shown and described in the copending application of Paul C. Gardner, Serial No. 188,465, filed October 4, 1950 and entitled Comparative Bridge Circuit. At the second amplifier stage 24, the overall sensitivity of the receiver is gradually increased during each reception interval by a time-variation-of-gain (TVG) control 25. This TVG control prevents false tripping of the steering control circuits on reverberation immediately following the ping and also prevents amplifier overloading on strong echo signals at close range.

The processed signals from both channels 20, 21, after a third amplifier stage 26, are rectified by a twin diode 27 and applied to a comparator bridge 28 which acts as interpreter and disseminator of information necessary for correct rudder and elevator operation. The elevator operation, controlled by the phase difference between the separate transducer output voltages, is not disclosed herein. The comparator bridge 28 comprises four resistor arms 31–34 joined at corners 35–38. During reception the right corner 36 is grounded through a pinger relay contact 39. The plates 40, 41 of the twin diode 27 are each connected to the left corner 38 of the bridge, and the cathodes 42, 43 are connected one to the upper corner 35 and the other to the lower corner 37. Potential from the left corner 38 is impressed through a resistor 44 on the control grid 45 of an echo trip pentode 46. The resistors 32, 34 at the right side of the bridge have a resistance twice that of the resistors 31, 33 at the left side.

Normally, when no echoes are present, the echo trip pentode 46 conducts plate current and an echo relay 47 in the plate circuit 48 is energized. When echoes are present and the rectified channel voltages $E_1$ and $E_2$ are equal, the voltage $E_R$ derived from the left bridge corner 38 for echo tube control is negative and equal to either channel voltage. When echoes are present and the rectified channel voltages $E_1$ and $E_2$ are unequal, the voltage $E_R$ is equal to minus one half the sum of the voltages $E_1$ and $E_2$, which is always negative.

The rudder 50 is thrown left or right by a reversible steering motor 51 having port and starboard field windings 52, 53. In the search stage, when no echoes arrive at the transducer, the port winding 52 is energized by −24 volts through a contact 53′ of a rudder control relay 54 in the plate circuit 55 of a rudder control tube 56. This tube 56 is normally cut off by the −48 volts applied to its grid 57 through a resistor 58.

When echoes reach the transducer, the left corner 38 of the bridge becomes negative regardless of the direction from which the echoes arrive, and the normally conducting echo pentode 46 is biased to cut off by the negative voltage impressed on its grid. This deenergizes the echo relay 47 and the resultant opening of its contact 59 disconnects the screen voltage from the pentode, causing it to remain locked out until the next ping when the pinger relay applies 600 volts through a resistor 60 to the screen grid 61. The pentode then returns to a conducting condition, whereby the echo relay closes and holds itself in until the reception of another echo.

When an echo is received and the echo relay 47 opens, its contact 62 applies +150 volts to the grid 57 of the rudder control tube 56 through resistors 63, 64. This tube 56, normally cut off by the negative voltage applied through resistor 58, now conducts whereby the rudder control relay 54 in its plate circuit is energized. Upon closing of the relay 54, its contact 53 opens so as to deenergize the port field 52, and a different contact 65 closes whereby the —24 volts is applied to the starboard field 53, causing the torpedo to turn in a starboard circle, away from the target.

Another contact 66 of the normally deenergized rudder control relay 54 serves to apply +300 volts to a condenser 67 through a charging resistor 68. When the rudder relay closes, the charged condenser 67 is connected to the grid 57 of the rudder control tube by a contact 69 of the rudder relay, while discharging through resistors 64 and 58. This initial charge on the condenser 67 is such that its discharge through the resistors 64, 58 will keep the rudder control tube conductive for about four ping intervals, thus providing a rudder relay hold-in time of about 3 seconds as a result of a single echo. If a series of echoes is received, incremental charges of 150 volts are applied to the capacitor 67 through the echo relay contact 62 and rudder relay contact 69, one charge for each echo after the first of the series. As a result the rudder relay 54 holds in until about one second after the last of a series of echoes is received.

The operation of the above time constant arrangement is as follows: if only one echo is received, such as may be the case at maximum range, the torpedo will turn starboard for about 3 seconds and thus avoid sweeping through and losing the target. If additional echoes, usually about five, are received, the torpedo will turn starboard for about a 5-ping interval plus one second, or for a total of about five seconds, before searching port again.

Various changes may be made in the form of invention herein shown and described without departing from the spirit of the invention or the scope of the following claims.

What is claimed is:

1. In an automatic steering system, a transmitter adapted to project pulses of wave energy at regular intervals, a receiver adapted to receive echoes of said pulses upon reflection from a target, a rudder movable between first and second spaced positions, one for left rudder and the other for right rudder, means normally initially disposing said rudder in said first position for a target search when no echoes are being received, means adapted to dispose said rudder in said second position responsive to the reception of an echo, and means coacting with said first and second mentioned means to effect a return of the rudder to said first position upon the expiration of a time interval following the reception of a single echo.

2. In an automatic steering system, a transmitter adapted to project pulses of wave energy at regular intervals, a receiver adapted to receive echoes of said pulses upon reflection from a target, a rudder movable between first and second spaced positions, one for left rudder and the other for right rudder, means normally initially disposing said rudder in said first position for a target search when no echoes are being received, means adapted to dispose said rudder in said second position responsive to the reception of the first of a series of echoes, and means coacting with said first and second mentioned means to effect a return of the rudder to said first position upon the expiration of a time interval following the reception of the last of said series of echoes.

3. In an automatic steering system, a transmitter adapted to project pulses of wave energy at regular intervals, a receiver adapted to receive echoes of said pulses upon reflection from a target, a rudder movable between first and second spaced positions, means normally initially disposing said rudder in said first position for a target search when no echoes are being received, means adapted to dispose said rudder in said second position responsive to the reception of an echo, means coacting with said first and second mentioned means to effect a return of the rudder to said first position upon the expiration of a time interval following the reception of a single echo only, said following time interval being equal in length to several of said regular intervals, and means coacting with said first and second mentioned means to effect a return of the rudder to said first position upon the expiration of another time interval of different length following the reception of the last of said series of echo signals, said different time interval being of a length greater than said regular interval.

4. In an automatic steering system, a transmitter adapted to project pulses of wave energy at regular intervals, a receiver adapted to receive echoes of said pulses upon reflection from a target, a rudder movable between first and second spaced positions, means normally initially disposing said rudder in said first position for a target search when no echoes are being received, means adapted to dispose said rudder in said second position responsive to the reception of an echo, and means coacting with said first and second mentioned means to effect a return of the rudder to said first position upon the expiration of a time interval following the reception of a single echo, said means including a resistance-capacitance circuit adapted to fix said following time interval at a length greater than that of one of said regular intervals.

5. In an automatic steering system, a transmitter adapted to project pulses of wave energy at regular intervals, a receiver adapted to receive echoes of said pulses upon reflection from a target, a rudder movable between first and second spaced positions, means normally initially disposing said rudder in said first position for a target search when no echoes are being received, means adapted to dispose said rudder in said second position responsive to the reception of the first of a series of echoes, and means coacting with said first and second mentioned means to effect a return of the rudder to said first position upon the expiration of a time interval following the reception of the last of a series of echoes, said means including a resistance-capacitance circuit adapted to fix said following time interval at a length greater than that of one of said regular time intervals.

6. In an automatic steering system for directing an underwater torpedo toward a submerged target, a transmitter in the head of the torpedo adapted to project pulses of wave energy at regular intervals, a receiver in the torpedo adapted to receive echoes of said pulses upon reflection from said target, means normally initially disposing the torpedo rudder in one off-center position for a search when no echoes are being received, means adapted to throw the rudder into an oppositely off-center position responsive to the reception of an echo by said receiver, and means coacting with said first and second mentioned means to effect a return of the rudder to said first-mentioned off-center position upon the expiration of a time interval following reception of a single echo signal, the length of said following time interval being equal to several regular intervals.

7. In an automatic steering system for directing an underwater torpedo toward a submerged target, a transmitter in the head of the torpedo adapted to project pulses of wave energy at regular intervals, a receiver in the torpedo adapted to receive echoes of said pulses upon reflection from said target, means normally initially disposing the torpedo rudder in one off-center position for a search when no echoes are being received, means adapted to throw the rudder into an oppositely off-center position responsive to the reception of an echo by said receiver, means coacting with said first and second mentioned means to effect a return of the rudder to said first-mentioned off-center position upon the expiration of a time interval following reception of the last of a series of echo signals, the length of said following time interval being greater than one of said regular intervals.

8. In an automatic steering system for directing a moving body equipped with reversible motorized azimuth steering gear toward a wave energy reflecting surface, a wave energy transmitter, means including a pinger relay periodically energizing said transmitter so as to generate wave energy pulses at regular intervals, a receiver adapted to convert echoes of said pulses upon reception into electrical pulses, an echo responsive relay, means including said pinger relay adapted to set said echo responsive relay in a first position, means responsive to the generation of an electrical pulse by said receiver adapted to set said echo responsive relay in a second position, a rudder control relay, means adapted to set said rudder control relay in a first position upon disposition of said echo responsive relay in its second position, means including a time delay circuit adapted to set said rudder control relay in a second position upon the expiration of a time interval following the last electrical pulse generated by said receiver, and rudder relay circuits adapted upon disposition of said rudder relay in its first and second positions, respectively, to position said steering gear for turning said body in opposite directions.

9. In an automatic steering system for directing a moving body equipped with reversible motorized azimuth steering gear toward a wave energy reflecting surface, a wave energy transmitter, means including a pinger relay periodically energizing said transmitter so as to generate wave energy pulses at regular intervals, a receiver adapted to convert echoes of said pulses upon reception into electrical pulses, an echo signal responsive electron tube, an echo signal responsive relay energized upon the conduction of plate current by said tube, means including said pinger relay adapted to render said tube conductive and thus energize said echo signal responsive relay, means responsive to the generation of an electrical pulse by said receiver adapted to supply cut-off bias to said tube and thus deenergize said echo signal responsive relay, circuits controlled by said echo signal responsive relay in its energized and deenergized positions respectively adapted to normally maintain said echo signal responsive electron tube conductive or non-conductive, a rudder control electron tube, a normally deenergized rudder control relay energized upon the conduction of plate current by said rudder control electron tube, means adapted to cause conduction of said rudder control tube during the period of deenergization of said echo responsive relay, means including a condenser and a resistor constituting a time delay circuit adapted to maintain said rudder control tube conductive for a time interval following energization of said echo responsive relay, and rudder relay circuits adapted upon disposition of said rudder relay in its energized and deenergized positions, respectively, to position said steering gear for turning said body in opposite directions.

References Cited by the Examiner
UNITED STATES PATENTS

| | | |
|---|---|---|
| 2,109,475 | 3/1938 | Fanning. |
| 2,409,632 | 10/1946 | King _____ 114—23 |
| 2,424,193 | 7/1947 | Rost et al. _____ 343—7 |
| 2,448,007 | 8/1948 | Ayres _____ 343—7 X |
| 2,557,401 | 6/1951 | Agins et al. _____ 244—14 |

BENJAMIN A. BORCHELT, *Primary Examiner.*

JAMES L. BREWRINK, NORMAN H. EVANS,
*Examiners.*